(12) United States Patent
Lin et al.

(10) Patent No.: US 10,588,297 B2
(45) Date of Patent: Mar. 17, 2020

(54) FILTER HAVING BACK-FLUSHING CLEANING DEVICE

(71) Applicant: SENSEN GROUP CO., LTD., Zhoushan, Zhejiang (CN)

(72) Inventors: Jianding Lin, Zhoushan (CN); Xunjun Xu, Zhoushan (CN)

(73) Assignee: SENSEN GROUP CO., LTD., Zhoushan, Zhejiang (CN)

( * ) Notice: Subject to any disclaimer, the term of this patent is extended or adjusted under 35 U.S.C. 154(b) by 0 days.

(21) Appl. No.: 16/317,399

(22) PCT Filed: Jul. 26, 2016

(86) PCT No.: PCT/CN2016/091676
§ 371 (c)(1),
(2) Date: Jan. 11, 2019

(87) PCT Pub. No.: WO2018/010210
PCT Pub. Date: Jan. 18, 2018

(65) Prior Publication Data
US 2019/0313611 A1      Oct. 17, 2019

(30) Foreign Application Priority Data

Jul. 12, 2016 (CN) .......................... 2016 1 0541370

(51) Int. Cl.
*A01K 63/04* (2006.01)
*B01D 29/68* (2006.01)
(Continued)

(52) U.S. Cl.
CPC ............ *A01K 63/045* (2013.01); *B01D 29/15* (2013.01); *B01D 29/68* (2013.01); *C02F 1/32* (2013.01);
(Continued)

(58) Field of Classification Search
CPC ...... A01K 63/045; B01D 29/15; B01D 29/68; C02F 1/32; C02F 2103/20; C02F 2201/006; C02F 2303/16
See application file for complete search history.

(56) References Cited

U.S. PATENT DOCUMENTS

2004/0173510 A1      9/2004    Jung

FOREIGN PATENT DOCUMENTS

CN      203829737 U    9/2014
CN      104707383 A    6/2015
(Continued)

*Primary Examiner* — Dirk R Bass
(74) *Attorney, Agent, or Firm* — Christensen, Fonder, Dardi & Herbert PLLC

(57) ABSTRACT

A filter with a backwashing unit including a two-position three-way valve, and second third valves. The three-way valve has ports P1, A1 and B1, the second valve has ports P2 and A2, and the third valve has port P3 and port A3; port P1 is connected with the water inlet, port A2 is connected with the outlet, port A3 is connected with the drain outlet, port A1 and port P3 are connected with the inlet of a filter, and port B1 and port P2 are connected with the outlet; the filter is located on a filtering station when port P1 communicates with port A1, port P2 communicates with port A2, and port P3 does not communicate with port A3, and the filter is on a backwashing station when port P1 communicates with port B1, port P2 does not communicate with port A2, and port P3 communicates with port A3.

16 Claims, 14 Drawing Sheets

(51) Int. Cl.
 *B01D 29/15* (2006.01)
 *C02F 1/32* (2006.01)
 *C02F 103/20* (2006.01)
(52) U.S. Cl.
 CPC .... *C02F 2103/20* (2013.01); *C02F 2201/006* (2013.01); *C02F 2303/16* (2013.01)

(56) References Cited

FOREIGN PATENT DOCUMENTS

| | | |
|---|---|---|
| CN | 104759126 A | 7/2015 |
| CN | 204735006 U | 11/2015 |
| CN | 205867701 U | 1/2017 |

US 10,588,297 B2

FILTER HAVING BACK-FLUSHING CLEANING DEVICE

RELATED APPLICATIONS

The present application is a National Phase entry of PCT Application No. PCT/CN2016/091676, filed July 26, which claims priority to Chinese Patent Application No. 201610541370.5, filed Jul. 12, 2016, the disclosures of which are hereby incorporated by reference herein in their entirety.

FIELD OF THE INVENTION

The present invention relates to the field of aquatic breeding devices and specifically relates to a filter with a backwashing unit.

BACKGROUND

A filter is an important part of an aquarium and has the effect of filtering impurities in water, fish excrement, fish secretions, residual feeds, rotten branches and leaves of aquatic plants and other wastes in the water by using a filter element in the filter, so that various indexes of the water are regulated, the water in the aquarium is kept fresh and transparent, and the quality of the water in the aquarium is kept stable. A filter system may include three filtration ways including physical filtration, chemical filtration and biological filtration according to a working principle.

Physical filtration is a method for obstructing insoluble impurities and wastes in water by using the filter element 2. After the filter operates for a period of time, as shown in FIG. 1, insoluble impurities 01 may be accumulated at the side, close to a water inlet 3 of the filter, of the filter element 2, and therefore, the filter element 2 is required to be washed regularly to ensure the normal operation of the filter.

At present, two methods for washing the filter element 2 are mainly provided, one of the methods is to take out the filter element 2 to be washed after dismounting a filter cartridge 1, and the other method is shown as FIG. 2, a backwashing method is adopted, namely clear water enters from a water outlet 4 and washes the insoluble impurities 01 out of a drain outlet 5. The former of the two washing methods is cumbersome in process and low in efficiency due to a requirement for dismounting the filter cartridge 1, the latter of the two washing methods may result in bloated appearances of the filter and even the whole aquarium due to a requirement for redundant external pipelines, in addition, the switching operation of a plurality of valves is troublesome and error-prone.

SUMMARY OF THE INVENTION

In order to conveniently and rapidly wash the filter element in the filter, the present invention provides a filter with a backwashing unit.

The technical solution adopted by the present invention is as follows:
a filter with a backwashing unit includes a filter cartridge, the filter cartridge is internally provided with a filter element, the filter cartridge is provided with a water inlet and a drain outlet in an inlet region of the filter element and is provided with a water outlet in an outlet region, the filter further includes a two-position three-way valve, a second valve and a third valve, the two-position three-way valve is provided with a port P1, a port A1 and a port B1, the second valve is provided with a port P2 and a port A2, and the third valve is provided with a port P3 and a port A3; the port P1 is connected with the water inlet, the port A2 is connected with the water outlet, and the port A3 is connected with the drain outlet; the port A1 and the port P3 are connected with the inlet region of the filter element, and the port B1 and the port P2 are connected with the outlet region of the filter element; and a filtering channel is formed by the water inlet, the port P1, the port A1, the inlet region of the filter element, the filter element, the outlet region of the filter element, the port P2, the port A2 and the water outlet when the port P1 communicates with the port A1, the port P2 communicates with the port A2 and the port P3 does not communicate with the port A3, and a backwashing channel is formed by the water inlet, the port P1, the port B1, the outlet region of the filter element, the filter element, the inlet region of the filter element, the port P3, the port A3 and the drain outlet when the port P1 communicates with the port B1, the port P2 does not communicate with the port A2 and the port P3 communicates with the port A3.

The two-position three-way valve, the second valve and the third valve are linked.

The filter cartridge is provided with an inlet passage, the port P1, the port A1 and the port B1 are arranged in the inlet passage, and the inlet passage is provided with a rotatable valve plate; and the valve plate is provided with a first position shielding the port B1 and a second position shielding the port A1, and the inlet passage and the valve plate form the two-position three-way valve.

The filter cartridge is provided with a cylindrical outlet passage, the port P2, the port A2, the port P3 and the port A3 are cross-shaped on the circumferential wall of the outlet passage, the port P2 and the port A2 are oppositely arranged, the port P3 and the port A3 are oppositely arranged, the outlet passage is internally provided with a rotatable valve element, and the valve element is provided with a communicating hole and baffles at two sides of the communicating hole; and the valve element is provided with a first station where the communicating hole communicates with the port P2 and the port A2, and the port P3 and the port A3 are shielded by the baffles, and a second station where the port P3 communicates with the port A3 by the communicating hole, and the port P2 and the port A2 are shielded by the baffles.

The valve element is provided with a pull rod, the other end of the pull rod is mounted on the valve plate, and the pull rod pulls the valve plate to synchronously rotate when the valve element rotates.

The edge of the valve element is provided with a pin, one end of the pull rod is fixedly arranged on a rotating shaft of the valve plate, and a slotted hole is formed in a free end of the pull rod and assembled on the pin.

The filter cartridge is a drum, the filter element is an annular element, the center of the drum is provided with a return pipe, the filter element is arranged outside the return pipe, the upper end of the return pipe communicates with the port B1 and the port P2, and the lower end of the return pipe communicates with the outlet region of the filter element; and a gap between the filter element and the filter cartridge is the inlet region of the filter element, and a gap between the filter element and the return pipe is the outlet region of the filter element.

The filter cartridge is provided with a roller at a position of the inlet region, the roller interferes with the filter element and is sunken into the filter element, and the roller is capable of driving the filter cartridge to rotate around the return pipe and also provided with a motor driving the roller to rotate; and the motor is stopped when the filter is located at the filtering station, and the motor is started when the filter is located at the backwashing station.

The filter element is formed by stacking a plurality of annular disks, and a plurality of notches are cylindrically arrayed on the cylindrical surfaces of the annular disks.

The roller includes a rotating shaft, the rotating shaft is fixedly provided with a long straight impeller in a circumferential direction, and the long straight impeller consists of a plurality of short cross-shaped impellers.

The short cross-shaped impellers are provided with a plurality of reinforcing ribs vertical to the rotating shaft.

A plurality of support frames are mounted outside the return pipe, the return pipe is in clearance fit with the support frames, and the annular disks are mounted in the support frames.

The support frames include lower locating rings, the edges of inner holes of the lower locating rings are provided with supporting cylinders, the upper ends of the supporting cylinders are detachably provided with upper locating rings, and the annular disks are mounted between the lower locating rings and the upper locating rings.

The supporting cylinders include a plurality of supporting rods arrayed circumferentially, the upper ends of the plurality of supporting rods are provided with fixing rings, and the upper ends of at least two of the supporting rods are provided with elastic snap joints for mounting the upper locating rings.

A plurality of water leakage holes are circumferentially arrayed in the lower locating rings and the upper locating rings.

The return pipe is internally provided with an ultraviolet germicidal lamp.

The filter has the beneficial effects that:
the switching between the filtering station and the backwashing station may be completed by only simultaneously switching the two-position three-way valve, the second valve and the third valve instead of changing the water flow directions of the water inlet and the water outlet, so that the whole process is simple, and the operation is convenient; in addition, the pipeline is compact in structure, and the overall appearance of the filter cartridge is also very simple.

Figure 1:
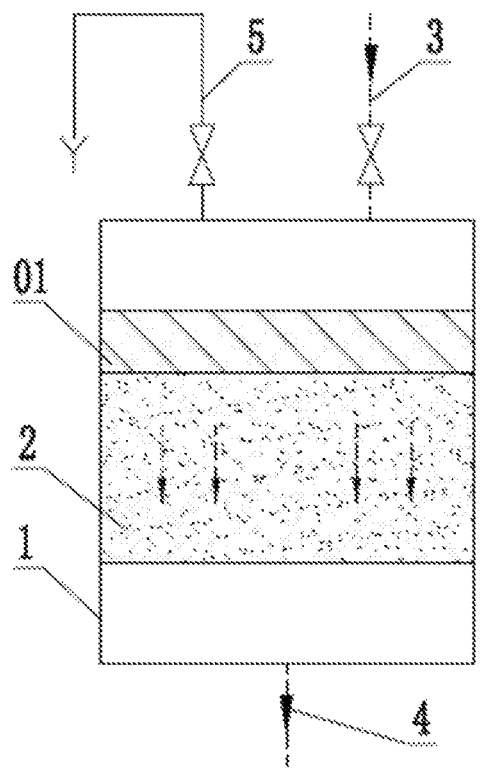
FIG. 1 is a schematic diagram of a filtering station of an existing filter.
Figure 2:
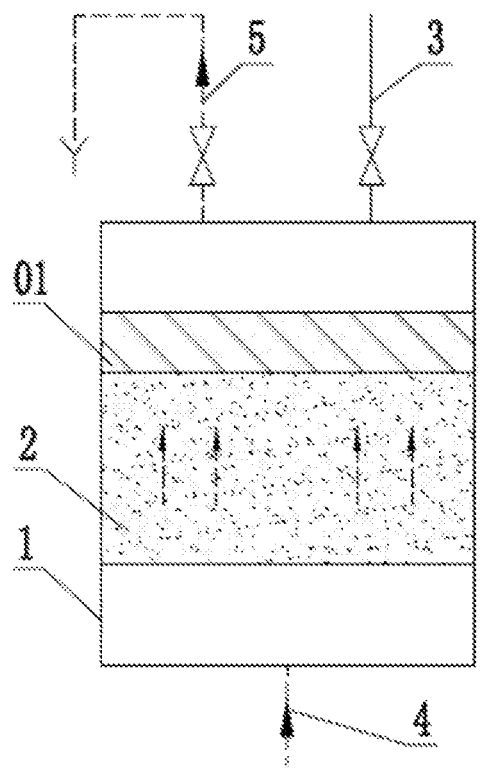
FIG. 2 is a schematic diagram of a backwashing station of the existing filter.

filter cartridge 1; filter element 2; water inlet 3; water outlet 4; drain outlet 5; return pipe 6; roller 7; motor 8; ultraviolet germicidal lamp 9; support frame 10; inlet passage 11; valve plate 12; outlet passage 13; valve element 14; communicating hole 15; baffle 16; edge pin 17; pull rod 18; slotted hole 19; annular disk 21; notch 22; rotating shaft 71; short cross-shaped impeller 72; reinforcing rib 73; lower locating ring 10-1; upper locating ring 10-2; supporting rod 10-3; fixing ring 10-4; elastic snap joint 10-5; water leakage hole 10-6; two-position three-way valve F1; second valve F2; third valve F3 and insoluble impurity 01.

DETAILED DESCRIPTION OF THE INVENTION

The present invention is further described below in combination with the accompanying drawings and embodiments.

Figure 3:
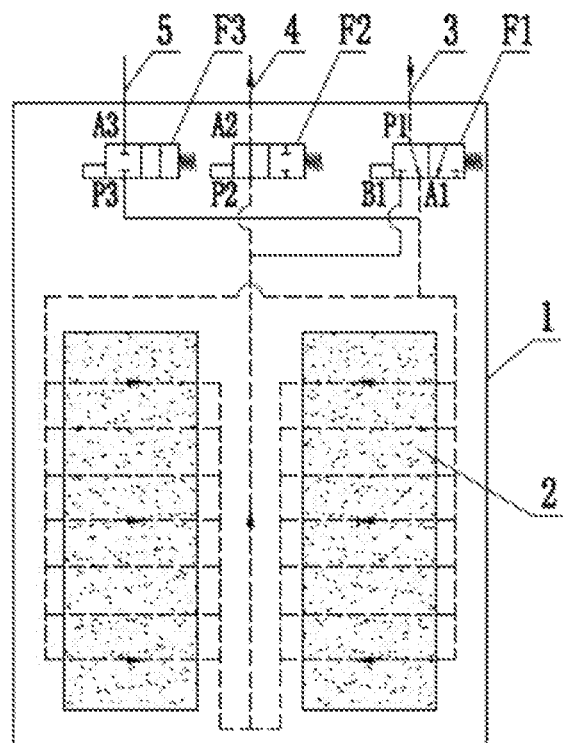
FIG. 3 is a principle diagram of the filtering station in an embodiment of the present invention.
Figure 4:
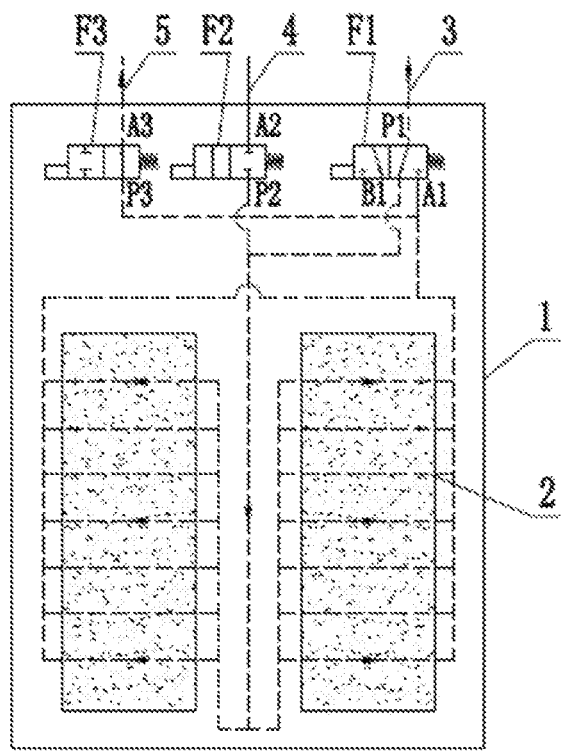
FIG. 4 is a principle diagram of the backwashing station in the embodiment of the present invention.
Figure 5:
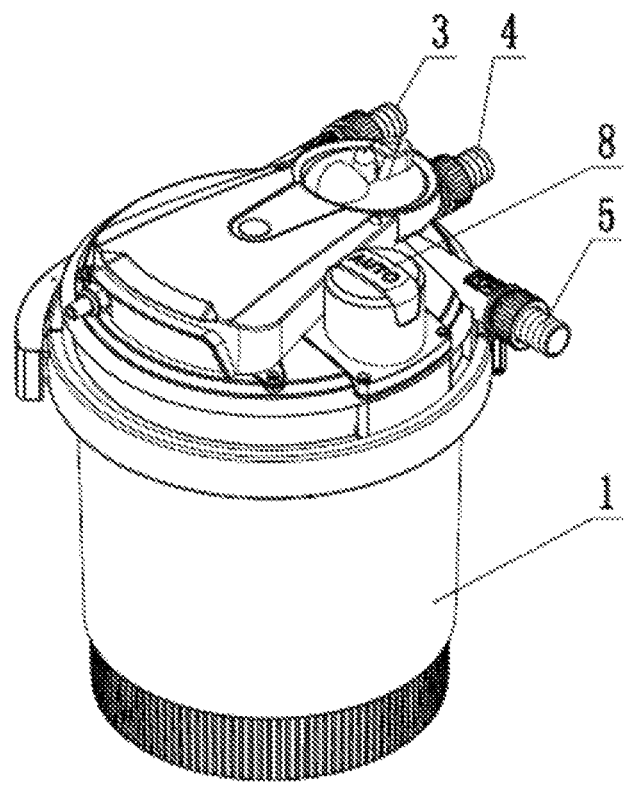
FIG. 5 is an axonometric diagram of the embodiment of the present invention.
Figure 6:
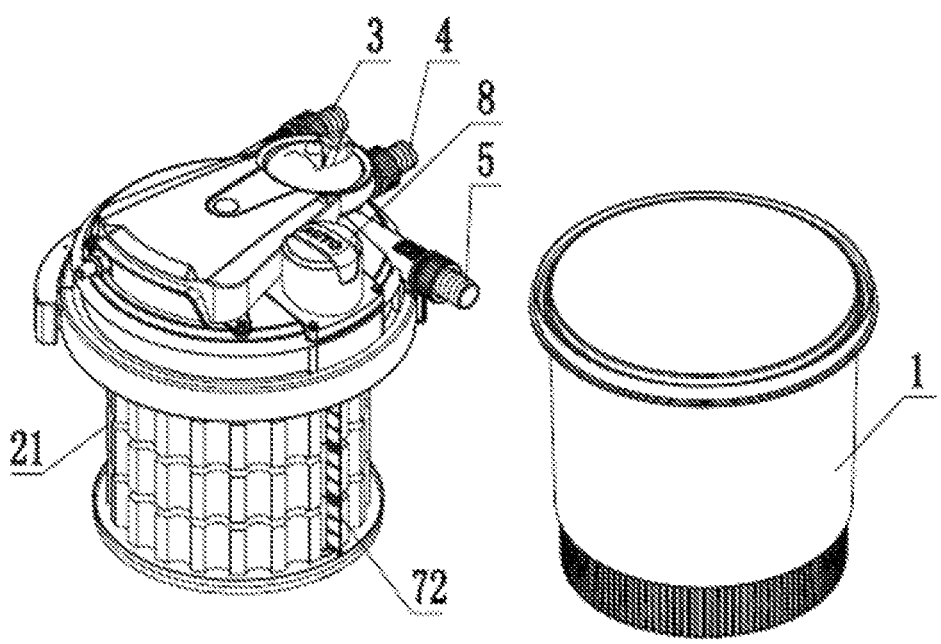
FIG. 6 is an explosive view of the embodiment of the present invention.
Figure 7:
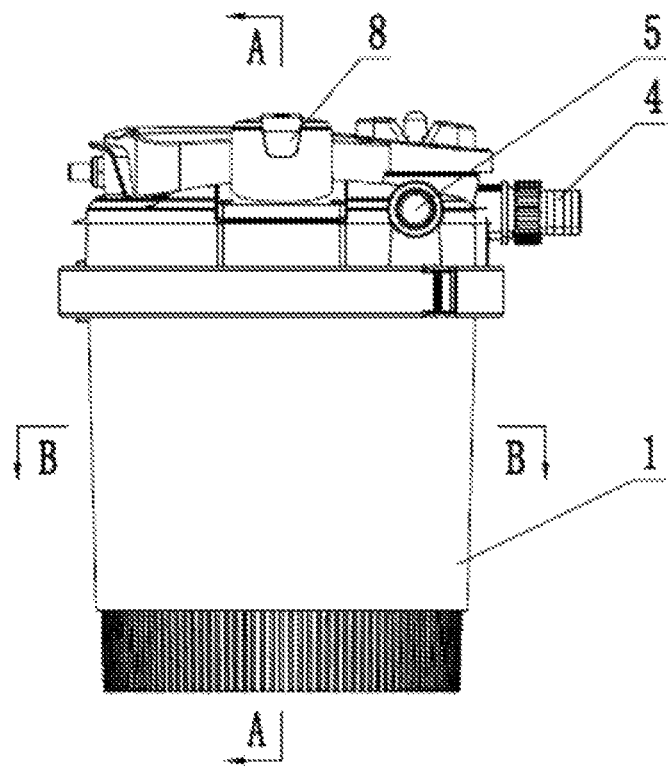
FIG. 7 is a front view of the embodiment of the present invention.

In an embodiment, as shown in FIG. 3 and FIG. 4, a filter with a backwashing unit includes a filter cartridge 1, the filter cartridge 1 is internally provided with a filter element 2, the filter cartridge 1 is provided with a water inlet 3 and a drain outlet 5 in an inlet region of the filter element 2 and is provided with a water outlet 4 in an outlet region, the filter further includes a two-position three-way valve F1, a second valve F2 and a third valve F3, the two-position three-way valve F1 is provided with a port P1, a port A1 and a port B1, the second valve F2 is provided with a port P2 and a port A2, and the third valve F3 is provided with a port P3 and a port A3; the port P1 is connected with the water inlet 3, the port A2 is connected with the water outlet 4, the port A3 is connected with the drain outlet 5, the port A1 and the port P3 are connected with the inlet region of the filter element 2, and the port B1 and the port P2 are connected with the outlet region of the filter element 2; and a filtering channel is formed by the water inlet 3, the port P1, the port A1, the inlet region of the filter element 2, the filter element 2, the outlet region of the filter element 2, the port P2, the port A2 and the water outlet 4 when the port P1 communicates with the port A1, the port P2 communicates with the port A2, and the port P3 does not communicate with the port A3, and a backwashing channel is formed by the water inlet 3, the port P1, the port B1, the outlet region of the filter element 2, the filter element 2, the inlet region of the filter element 2, the port P3, the port A3 and the drain outlet 5 when the port P1 communicates with the port B1, the port P2 does not communicate with the port A2, and the port P3 communicates with the port A3. The switching between the filtering station and the backwashing station may be completed by only simultaneously switching the two-position three-way valve F1, the second valve F2 and the third valve F3 instead of changing the water flow directions of the water inlet 3 and the water outlet 4, so that the whole process is simple, and the operation is convenient; in addition, the pipeline is compact in structure, and the overall appearance of the filter cartridge 1 is also very simple.

In the embodiment, as shown in FIG. 3 and FIG. 4, the two-position three-way valve F1, the second valve F2 and the third valve F3 are linked. The two-position three-way valve F1, the second valve F2 and the third valve F3 in the embodiment may be synchronously controlled by adopting an electromagnetic control valve or linked in a form of a mechanical structure.

In the embodiment, as shown in FIG. 10, FIG. 11, FIG. 12, FIG. 13 and FIG. 14, the filter cartridge 1 is provided with an inlet passage 11, the port P1, the port A1 and the port B1 are arranged in the inlet passage 11, and the inlet passage 11 is provided with a rotatable valve plate 12; and the valve plate 12 is provided with a first position shielding the port B1 and a second position shielding the port A1, and the inlet passage 11 and the valve plate 12 form the two-position three-way valve F1. In the embodiment, the two-position three-way valve F1 is composed of the runner and the structure inside the filter cartridge 1, and capable of omitting the pipeline and compact in structure compared with a common two-position three-way valve.

In the embodiment, as shown in FIG. 10, FIG. 11, FIG. 12, FIG. 13 and FIG. 14, the filter cartridge 1 is provided with a cylindrical outlet passage 13, the port P2, the port A2, the port P3 and the port A3 are cross-shaped on the circumferential wall of the outlet passage 13, the port P2 and the port A2 are oppositely arranged, the port P3 and the port A3 are oppositely arranged, the outlet passage 13 is internally provided with a rotatable valve element 14, and the valve element 14 is provided with a communicating hole 15 and baffles 16 at two sides of the communicating hole 15; and the valve element 14 is provided with a first station where the communicating hole 15 communicates with the port P2 and the port A2, and the port P3 and the port A3 are shielded by the baffles 16, and a second station where the communicating hole 15 communicates with the port P3 and the port A3, and the port P2 and the port A2 are shielded by the baffles 16.

According to the structure in the embodiment, the outlet passage 13 and the valve element 14 form the second valve F2 and the third valve F3, so that not only are functions of the two valves perfectly achieved, but also it is convenient to realize the linkage of the second valve F2 and the third valve F3.

In the embodiment, as shown in FIG. 11, FIG. 12, FIG. 13 and FIG. 14, the valve element 14 is provided with a pull rod 18, the other end of the pull rod 18 is mounted on the valve plate 12, and the pull rod 18 pulls the valve plate 12 to synchronously rotate when the valve element 14 rotates. According to the structure in the embodiment, the valve plate 12 and the valve element 14 which synchronously rotate realize the linkage of the two-position three-way valve F1, the second valve F2 and the third valve F3 in the form of the mechanical structure, so that the structure has the characteristics of reliable structure and low fault rate.

In the embodiment, as shown in FIG. 11, FIG. 12, FIG. 13 and FIG. 14, the edge of the valve element 14 is provided with a pin 17, one end of the pull rod 18 is fixedly arranged on a rotating shaft of the valve plate 12, and a slotted hole 19 is formed in a free end of the pull rod 18 and assembled on the pin 17. Similarly, one end of the pull rod 18 may also be alternatively fixedly arranged on the pin 17, and the slotted hole 19 is assembled on the rotating shaft of the valve plate 12.

Figure 12:
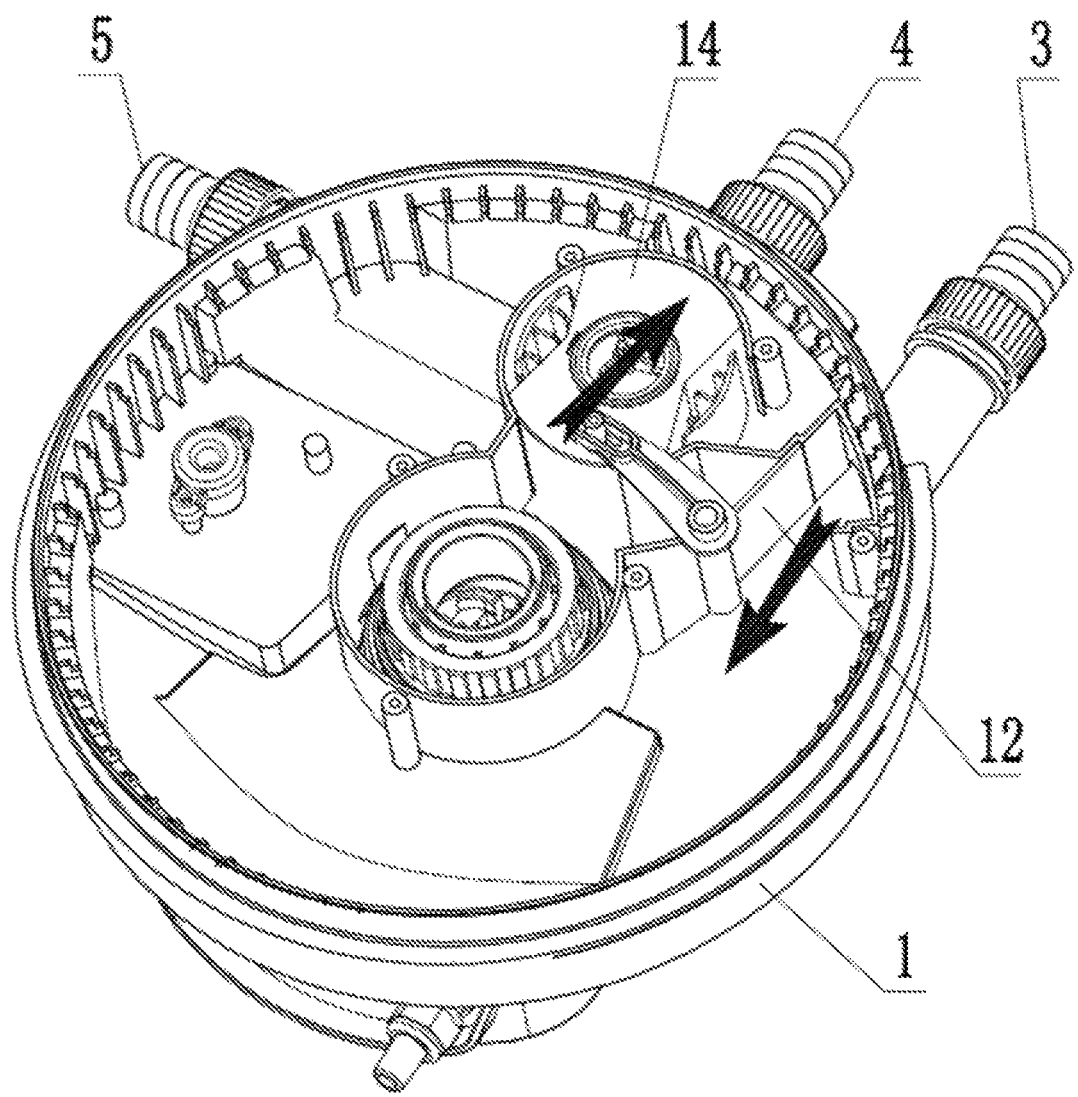
FIG. 12 is a structural schematic diagram of the filtering station in the embodiment of the present invention.
Figure 13:
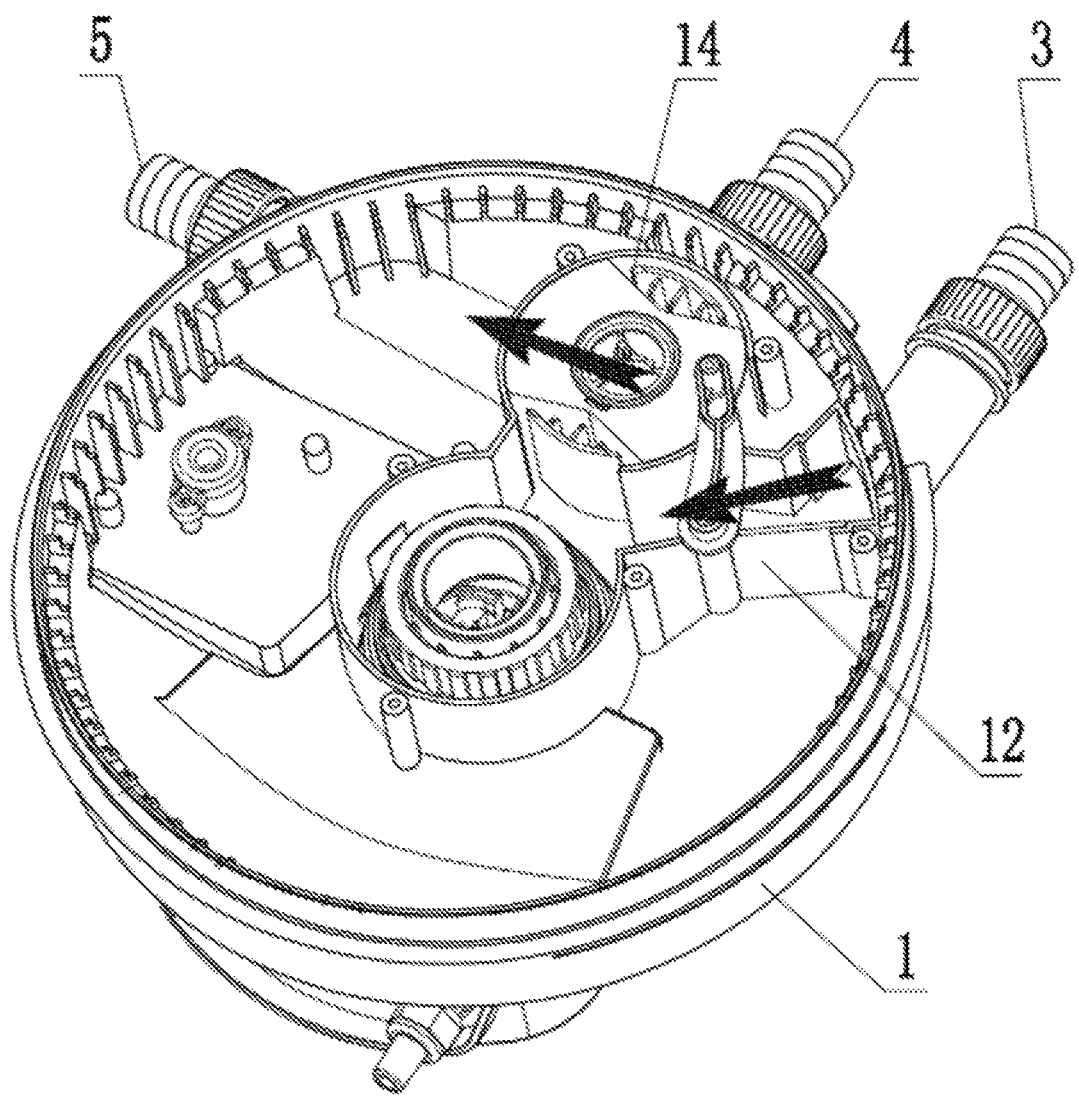
FIG. 13 is a structural schematic diagram of the backwashing station in the embodiment of the present invention.

In the embodiment, as shown in FIG. 12, the arrow direction is a water flow direction when the filter is located at the filtering station, and the water flow enters the water inlet 3 and flows out of the water outlet 4; and as shown in FIG. 13, the arrow direction is a water flow direction when the filter is located at the backwashing station, and a water flow enters the water inlet 3 and flows out of the drain outlet 5. In the embodiment, as shown in FIG. 5, FIG. 6, FIG. 7, FIG. 8 and FIG. 9, the filter cartridge 1 is a drum, the filter element 2 is an annular element, the center of the drum is provided with a return pipe 6, the filter element 2 is arranged outside the return pipe 6, the upper end of the return pipe 6 communicates with the port B1 and the port P2, and the lower end of the return pipe 6 communicates with the outlet region of the filter element 2; and a gap between the filter element 2 and the filter cartridge 1 is the inlet region of the filter element 2, and a gap between the filter element 2 and the return pipe 6 is the outlet region of the filter element 2. In the embodiment, the cylindrical surface, namely a filtering surface, of the filter element 2 is larger in filtering area and better in filtering performances, compared with a way of filtration from top to bottom or from bottom to top.

In the embodiment, as shown in FIG. 6, FIG. 7, FIG. 8 and FIG. 9, the filter cartridge 1 is provided with a roller 7 at a position of the inlet region, the roller 7 interferes with the filter element 2 and is sunken into the filter element 2, and the roller 7 is capable of driving the filter cartridge 1 to rotate around the return pipe 6 and also provided with a motor 8 driving the roller 7 to rotate; and the motor 8 is stopped when the filter is located at the filtering station, and the motor 8 is started when the filter is located at the backwashing station. In the embodiment, the roller 7 is capable of driving the filter element 2 to rotate when the filter is on the backwashing station, so that washing may be more thoroughly completed; the motor 8 and the valve element 14 are linked, namely the motor 8 is stopped when the valve element 14 is located on the first station, and the motor 8 is started when the valve element 14 is located on the second station; the linkage of the motor 8 and the valve element 14 may be realized by adopting a contact switch or a chip or a program; the valve element 14 may be manually switched or automatically switched by adopting the motor; and the motor 8 and the valve element 14 may be further operated by utilizing a mobile phone APP or other remote control terminals.

In the embodiment, as shown in FIG. 6, FIG. 9, FIG. 15 and FIG. 16, the filter element 2 is formed by stacking a plurality of annular disks 21, and a plurality of notches 22 are cylindrically arrayed on the cylindrical surfaces of the annular disks 21. The filter element 2 in the embodiment includes the plurality of annular disks 21, the annular disks 21 may be made of a porous material with a certain elasticity, such as filtering cotton and filtering gauze so as to be very convenient to process, mount and maintain, and the notches 22 are used for ensuring that the roller 7 smoothly drives the annular disks 21 to rotate.

Figure 18:
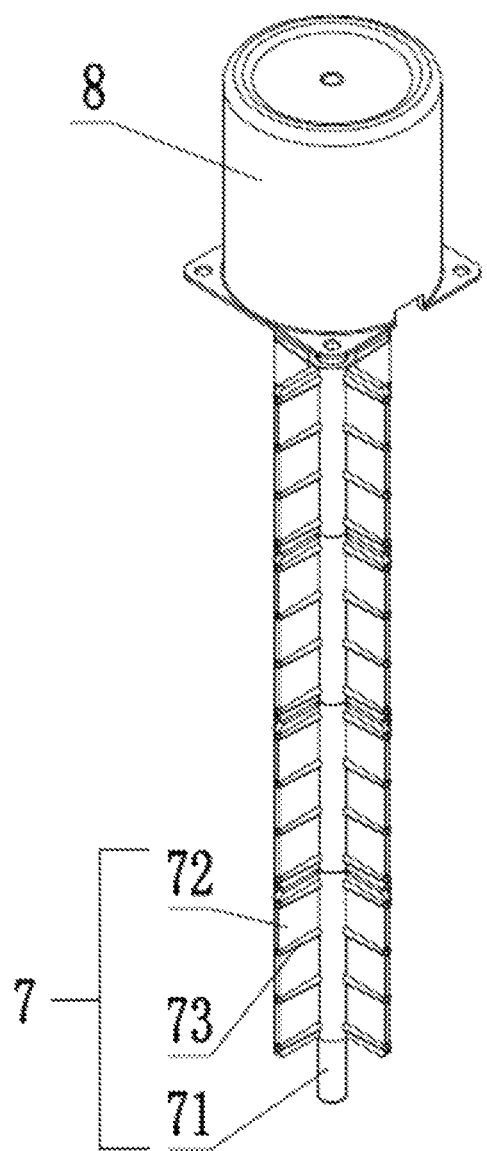
FIG. 18 is an assembly schematic diagram of a roller and a motor in the embodiment of the present invention.
Figure 19:
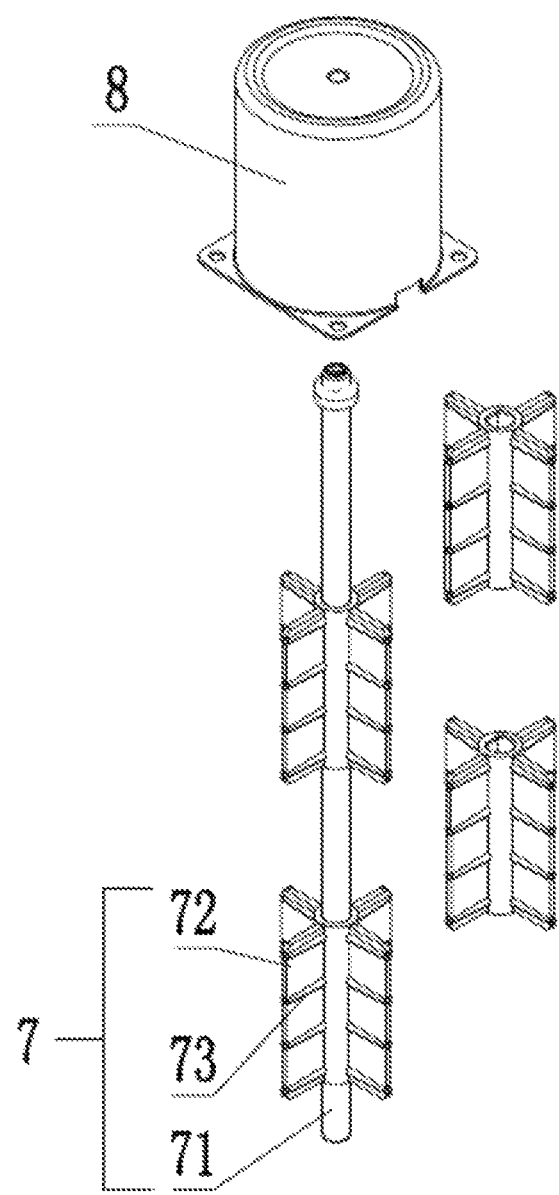
FIG. 19 is an explosive schematic diagram of the roller and the motor in the embodiment of the present invention.

In the embodiment, as shown in FIG. 18 and FIG. 19, the roller 7 includes a rotating shaft 71, the rotating shaft 71 is fixedly provided with a long straight impeller in a circumferential direction, and the long straight impeller consists of a plurality of short cross-shaped impellers 72. The roller 7 in the embodiment drives the annular disks 21 to rotate by virtue of cross-shaped blades of the short cross-shaped impellers 72 so as to have the advantages of good stability and no slippage.

In the embodiment, as shown in FIG. 18 and FIG. 19, the short cross-shaped impellers 72 are provided with a plurality of reinforcing ribs 73 vertical to the rotating shaft 71. The reinforcing ribs 73 in the embodiment are higher than the surfaces of the short cross-shaped impellers 72 and may play roles in enhancing friction and avoiding slippage in addition to the effect of strength improvement.

Figure 15:
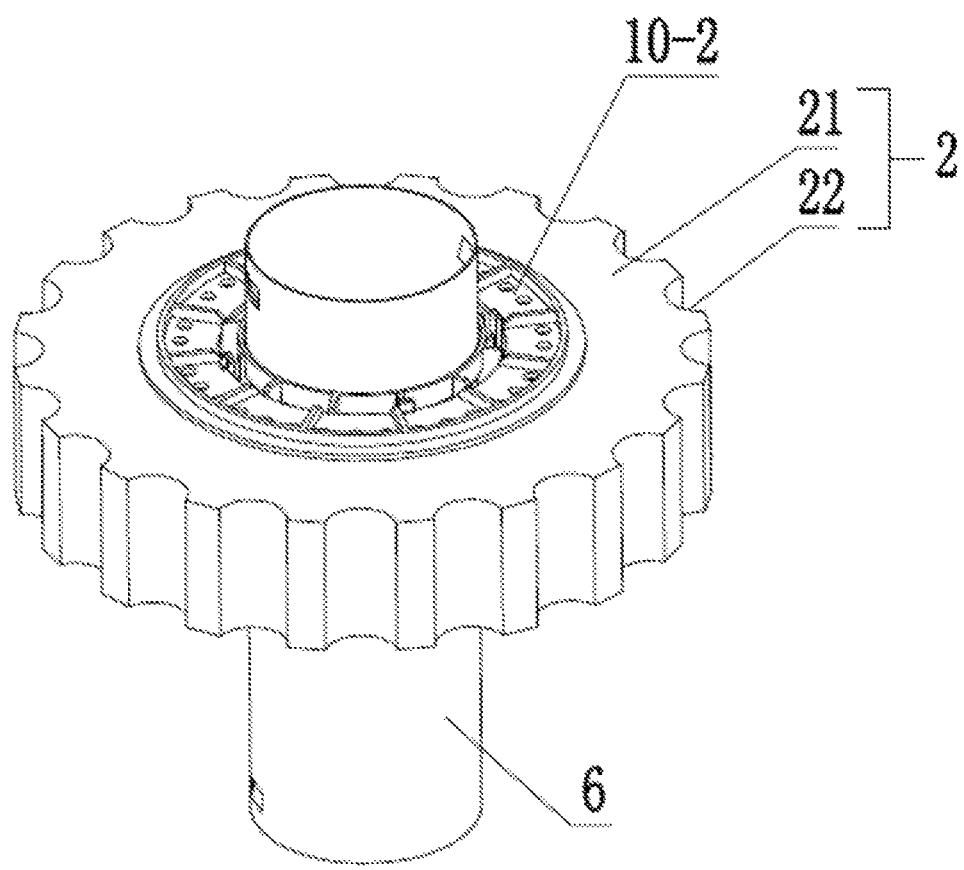
FIG. 15 is an assembly schematic diagram of a return pipe and annular disks in the embodiment of the present invention.
Figure 16:
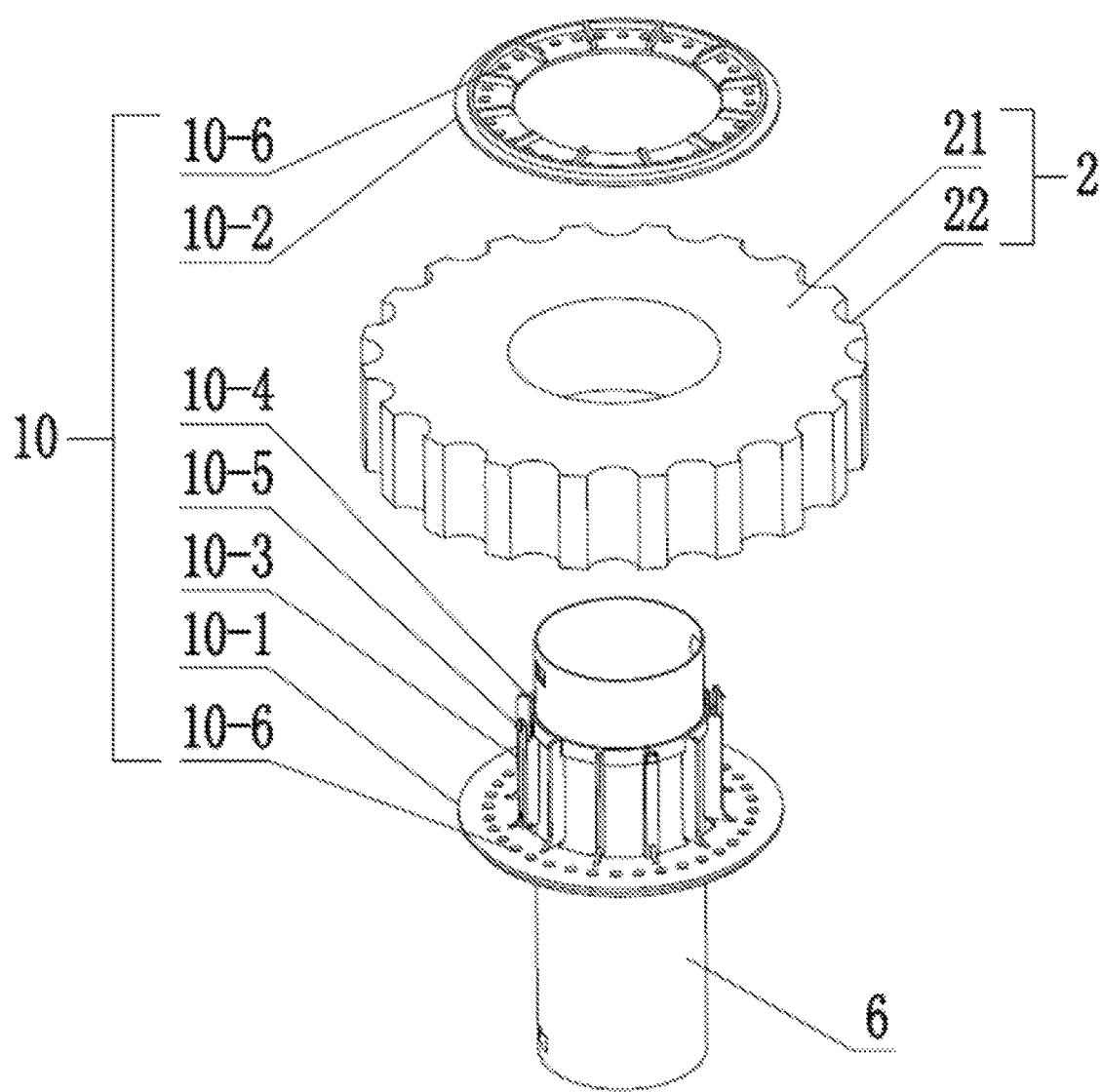
FIG. 16 is an explosive schematic diagram of the return pipe and the annular disks in the embodiment of the present invention.
Figure 17:
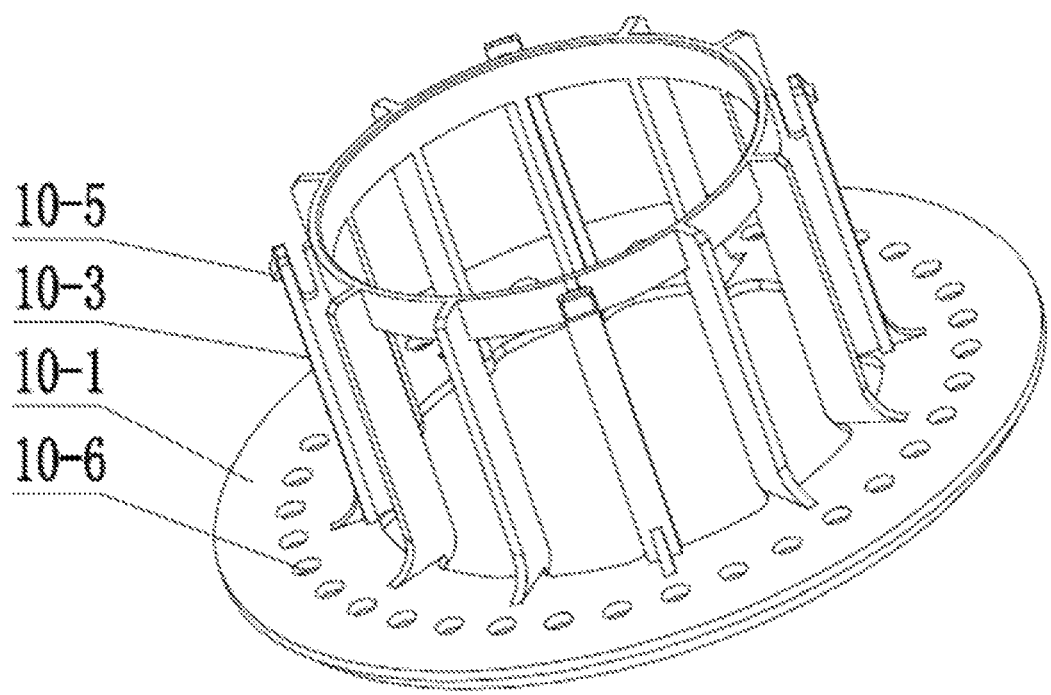
FIG. 17 is a schematic diagram of lower locating rings and supporting rods in the embodiment of the present invention.

In the embodiment, as shown in FIG. 15, FIG. 16 and FIG. 17, a plurality of support frames 10 are mounted outside the return pipe 6, the return pipe 6 is in clearance fit with the support frames 10, and the annular disks 21 are mounted in the support frames 10. The support frames 10 in the embodiment play a role in supporting the annular disks 21 and are capable of rotating around the return pipe 6.

In the embodiment, as shown in FIG. 15, FIG. 16 and FIG. 17, the support frames 10 include lower locating rings 10-1, the edges of inner holes of the lower locating rings 10-1 are provided with supporting cylinders, the upper ends of the supporting cylinders are detachably provided with upper locating rings 10-2, and the annular disks 21 are mounted between the lower locating rings 10-1 and the upper locating rings 10-2. The structures of the support frames 10 in the embodiment are assembled structure so as to be convenient to mount and dismount the annular disks 21.

In the embodiment, as shown in FIG. 16 and FIG. 17, the supporting cylinders include a plurality of supporting rods 10-3 arrayed circumferentially, the upper ends of the plurality of supporting rods 10-3 are provided with fixing rings 10-4, and the upper ends of at least two of the supporting rods 10-3 are provided with elastic snap joints 10-5 for mounting the upper locating rings 10-2. In the embodiment, detachable structures with other forms may also be selected, however, relatively speaking, the elastic snap joints 10-5 are easier to dismount, relatively good in stability and not easy to damage.

In the embodiment, as shown in FIG. 16 and FIG. 17, a plurality of water leakage holes 10-6 are circumferentially arrayed in the lower locating rings 10-1 and the upper locating rings 10-2. In the embodiment, a single row of water leakage holes 10-6 is selected or double rows or a plurality of rows of water leakage holes 10-6 may be selected so as to reduce obstructions of the support frames 10 to the water flow in the outlet region of the filter element 2.

Figure 8:
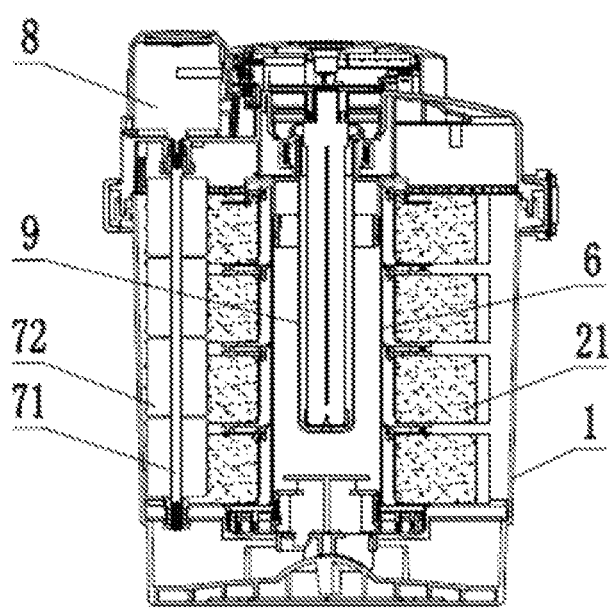
FIG. 8 is a sectional view of A-A in the embodiment of the present invention.
Figure 9:
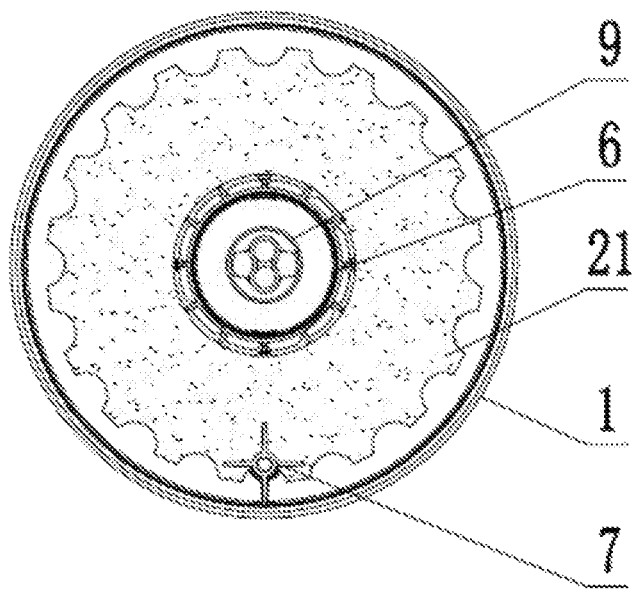
FIG. 9 is a sectional view of B-B in the embodiment of the present invention.
Figure 10:
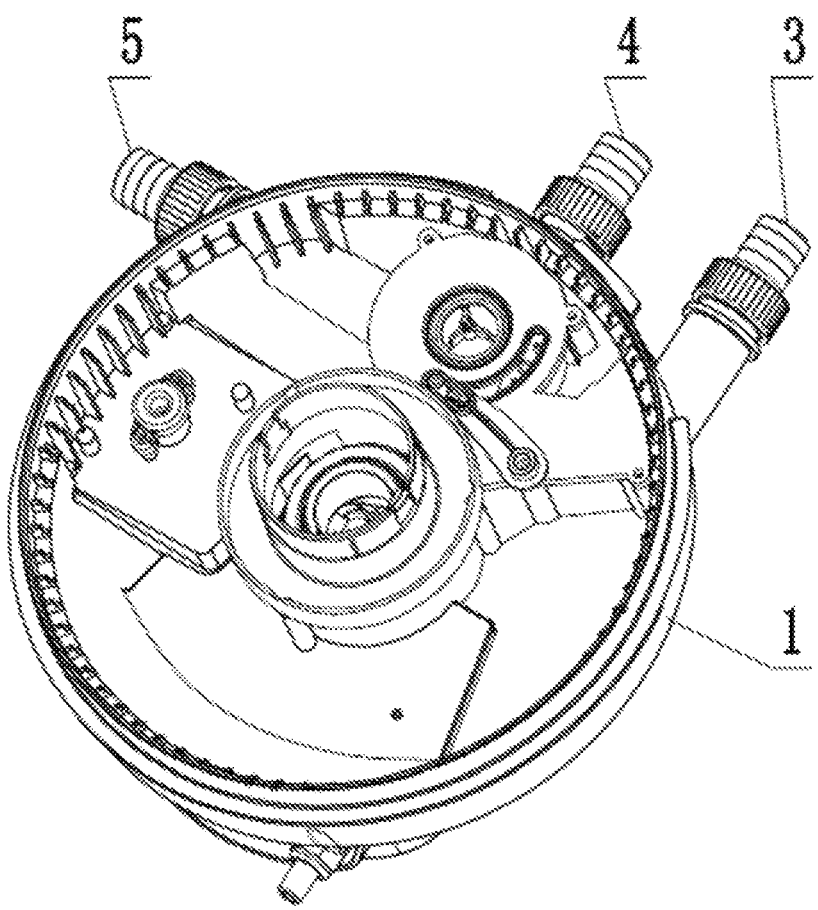
FIG. 10 is an assembly diagram of an inlet passage and an outlet passage in the embodiment of the present invention.
Figure 11:
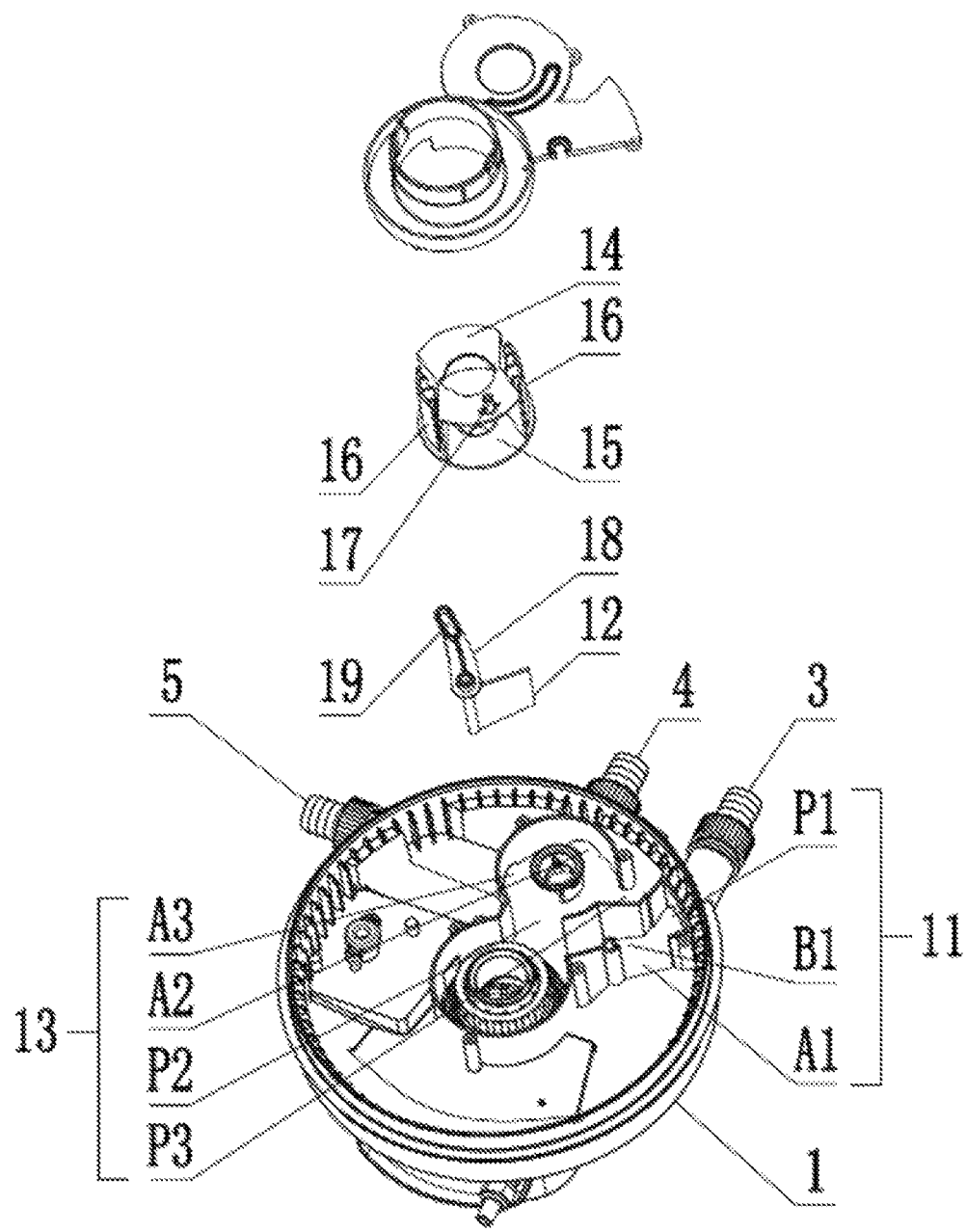
FIG. 11 is an explosive view of the inlet passage and the outlet passage in the embodiment of the present invention.

In the embodiment, as shown in FIG. 8, the return pipe 6 is internally provided with an ultraviolet germicidal lamp 9. Ultraviolet disinfection also belongs to a physical method, is free of adding any substances into water and incapable of resulting in side effects and is cooperated with material filtration to complement each other.

Figure 14:
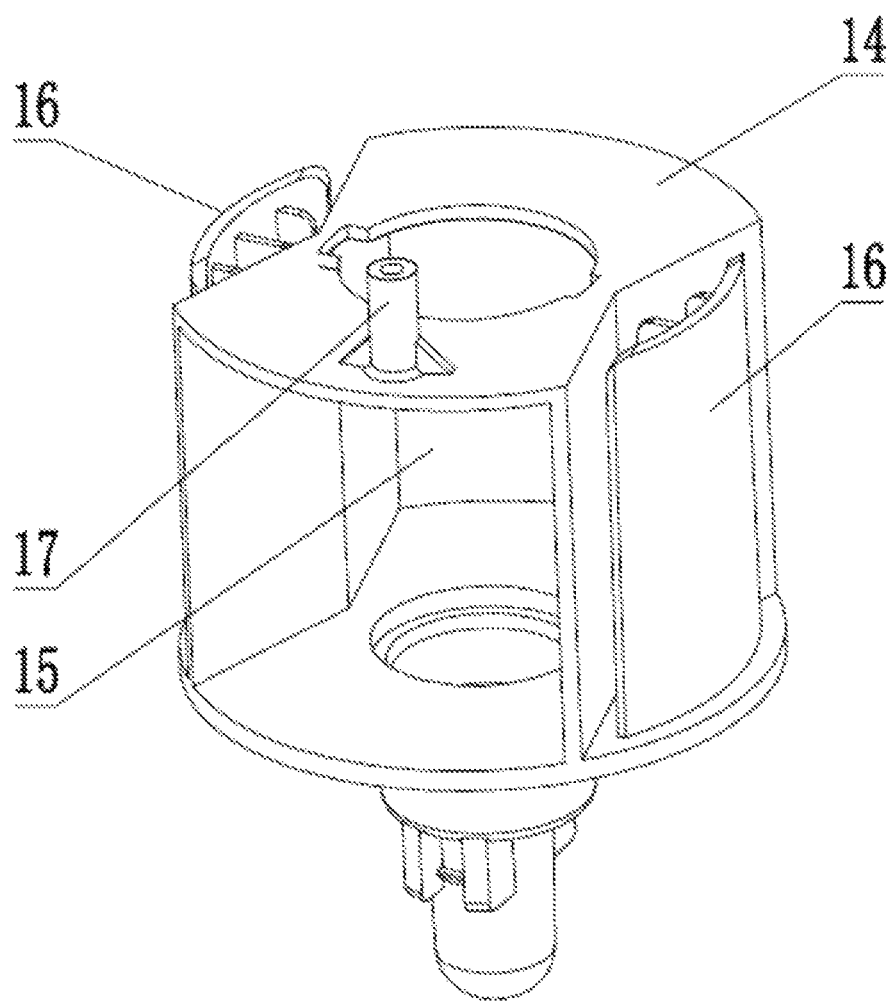
FIG. 14 is a structural schematic diagram of a valve element in the embodiment of the present invention.

In the embodiment, as shown in FIG. 14, gaps for mounting sealing rings are arranged between the baffles 16 and the valve element 14, so that the sealing performances of the second valve F2 and the third valve F3 are better.

The filter cartridge 1 in the embodiment of the present invention includes a cartridge body and an upper cover, the cartridge body is fixedly connected with the upper cover by a clamping band, in addition, all the two-position three-way valve F1, the second valve F2, the third valve F3, the roller 7, the motor 8 and the ultraviolet germicidal lamp 9 are arranged on the upper cover so as to have the characteristic of convenience in dismounting, washing and maintenance.

It is apparent that the embodiment of the present invention is only intended to describe an example given by the present invention, rather than to limit the implementation way of the present invention. Other variations or alterations with different forms may also be made on the basis of the description by the ordinary skilled in the art. Exemplifications for all the implementation ways are not needed and may not be realized herein. But the apparent variations or alterations derived from the substantive spirit of the present invention still fall into the scope of the present invention.

The invention claimed is:

1. A filter with a backwashing unit, comprising a filter cartridge, the filter cartridge being internally provided with a filter element, the filter cartridge being provided with a water inlet and a drain outlet in an inlet region of the filter element and being provided with a water outlet in an outlet region, wherein the filter further comprises a two-position three-way valve, a second valve and a third valve, the two-position three-way valve being provided with a port P1, a port A1 and a port B1, the second valve being provided with a port P2 and a port A2, and the third valve being provided with a port P3 and a port A3; the port P1 being connected with the water inlet, the port A2 being connected with the water outlet, the port A3 being connected with the drain outlet, the port A1 and the port P3 being connected with the inlet region of the filter element, and the port B1 and the port P2 being connected with the outlet region of the filter element; and a filtering channel being formed by the water inlet, the port P1, the port A1, the inlet region of the filter element, the filter element, the outlet region of the filter element, the port P2, the port A2 and the water outlet 4 when the port P1 communicates with the port A1, the port P2 communicates with the port A2 and the port P3 does not communicate with the port A3, and a backwashing channel being formed by the water inlet, the port P1, the port B1, the outlet region of the filter element, the filter element, the inlet region of the filter element, the port P3, the port A3 and the drain outlet 5 when the port P1 communicates with the port B1, the port P2 does not communicate with the port A2 and the port P3 communicates with the port A3;

wherein the filter cartridge is provided with a cylindrical outlet passage, the port P2, the port A2, the port P3 and the port A3 are cross-shaped on the circumferential wall of the outlet passage, the port P2 and the port A2 are oppositely arranged, the port P3 and the port A3 are oppositely arranged, the outlet passage is internally provided with a rotatable valve element, and the valve element is provided with a communicating hole and baffles at two sides of the communicating hole; and the valve element is provided with a first station where the communicating hole communicates with the port P2 and the port A2, and the port P3 and the port A3 are shielded by the baffles, and a second station where the communicating hole communicates with the port P3 and the port A3, and the port P2 and the port A2 are shielded by the baffles.

2. The filter with the backwashing unit of claim 1, wherein the two-position three-way valve, the second valve and the third valve are linked.

3. The filter with the backwashing unit of claim 2, wherein the filter cartridge is provided with an inlet passage, the port P1, the port A1 and the port B1 are arranged in the inlet passage, and the inlet passage is provided with a rotatable valve plate; and the valve plate is provided with a first position shielding the port B1 and a second position shielding the port A1, and the inlet passage and the valve plate form the two-position three-way valve.

4. The filter with the backwashing unit of claim 2, wherein the valve element is provided with a pull rod, the other end of the pull rod is mounted on the valve plate, and the pull rod pulls the valve plate to synchronously rotate when the valve element rotates.

5. The filter with the backwashing unit of claim 3, wherein the edge of the valve element is provided with a pin, one end of the pull rod is fixedly arranged on a rotating shaft of the valve plate, and a slotted hole is formed in a free end of the pull rod and assembled on the pin.

6. The filter with the backwashing unit of claim 1, wherein the filter cartridge is a drum, the filter element is an annular element, the center of the drum is provided with a return pipe, the filter element is arranged outside the return pipe, the upper end of the return pipe communicates with the port B1 and the port P2, and the lower end of the return pipe communicates with the outlet region of the filter element; and a gap between the filter element and the filter cartridge is the inlet region of the filter element, and a gap between the filter element and the return pipe is the outlet region of the filter element.

7. The filter with the backwashing unit of claim 4, wherein the filter cartridge is provided with a roller at a position of the inlet region, the roller interferes with the filter element and is sunken into the filter element, and the roller is capable of driving the filter cartridge to rotate around the return pipe and also provided with a motor driving the roller to rotate; and the motor is stopped when the filter is located at the filtering station, and the motor is started when the filter is located at the backwashing station.

8. The filter with the backwashing unit of claim 7, wherein the filter element is formed by stacking a plurality of annular disks, and a plurality of notches are cylindrically arrayed on the cylindrical surfaces of the annular disks.

9. The filter with the backwashing unit of claim 7, wherein the roller comprises a rotating shaft, the rotating shaft is fixedly provided with a long straight impeller in a circumferential direction, and the long straight impeller consists of a plurality of short cross-shaped impellers.

10. The filter with the backwashing unit of claim 9, wherein the short cross-shaped impellers are provided with a plurality of reinforcing ribs vertical to the rotating shaft.

11. The filter with the backwashing unit of claim 8, wherein a plurality of support frames are mounted outside the return pipe, the return pipe is in clearance fit with the support frames, and the annular disks are mounted in the support frames.

12. The filter with the backwashing unit of claim 11, wherein the support frames comprise lower locating rings, the edges of inner holes of the lower locating rings are provided with supporting cylinders, the upper ends of the supporting cylinders are detachably provided with upper locating rings, and the annular disks are mounted between the lower locating rings and the upper locating rings.

13. The filter with the backwashing unit of claim 12, wherein the supporting cylinders comprise a plurality of supporting rods arrayed circumferentially, the upper ends of the plurality of supporting rods are provided with fixing rings, and the upper ends of at least two of the supporting rods are provided with elastic snap joints for mounting the lower locating rings.

14. The filter with the backwashing unit of claim 12, wherein a plurality of water leakage holes are circumferentially arrayed in the lower locating rings and the upper locating rings.

15. The filter with the backwashing unit of claim 6, wherein the return pipe is internally provided with an ultraviolet germicidal lamp.

16. The filter with the backwashing unit of claim 8, wherein the roller comprises a rotating shaft, the rotating shaft is fixedly provided with a long straight impeller in a circumferential direction, and the long straight impeller consists of a plurality of short cross-shaped impellers.

* * * * *